United States Patent [19]

Bohlmann

[11] 4,130,090

[45] Dec. 19, 1978

[54] AUTOMATIC LIVESTOCK WATERER

[76] Inventor: Orville R. Bohlmann, P.O. Box 344, Dension, Iowa 51442

[21] Appl. No.: 606,432

[22] Filed: Aug. 21, 1975

[51] Int. Cl.² .............................................. A01K 7/02
[52] U.S. Cl. ......................................... 119/73; 119/78
[58] Field of Search ................... 119/73, 72, 74, 80, 119/78, 51.5, 77, 78, 79

[56] References Cited

U.S. PATENT DOCUMENTS

| 2,466,135 | 4/1949 | Townsend | 119/73 |
| 2,674,227 | 4/1954 | Saunders et al. | 119/80 |
| 2,825,302 | 3/1958 | Donahoe et al. | 119/78 |
| 3,636,312 | 1/1972 | Drehes et al. | 119/80 |
| 3,823,692 | 7/1974 | Bowser | 119/78 |

Primary Examiner—Russell R. Kinsey
Assistant Examiner—Daniel J. Leach
Attorney, Agent, or Firm—Henderson, Strom, Sturm, Cepican & Fix

[57] ABSTRACT

An automatic livestock waterer having a concrete housing. Formed within the upper portion of the housing is a trough which is adapted to hold water. A well spaced away from said trough is also formed within said housing. A float control element for regulating the water level in the trough is coupled to a plumbing element mounted in said well, and which is connected to the water source, providing a conduit for the water from the water source to the float. The housing contains a service aperture adjacent to the well for servicing the control elements and plumbing elements. A hood extends over and around the float and associated heating element.

1 Claim, 6 Drawing Figures

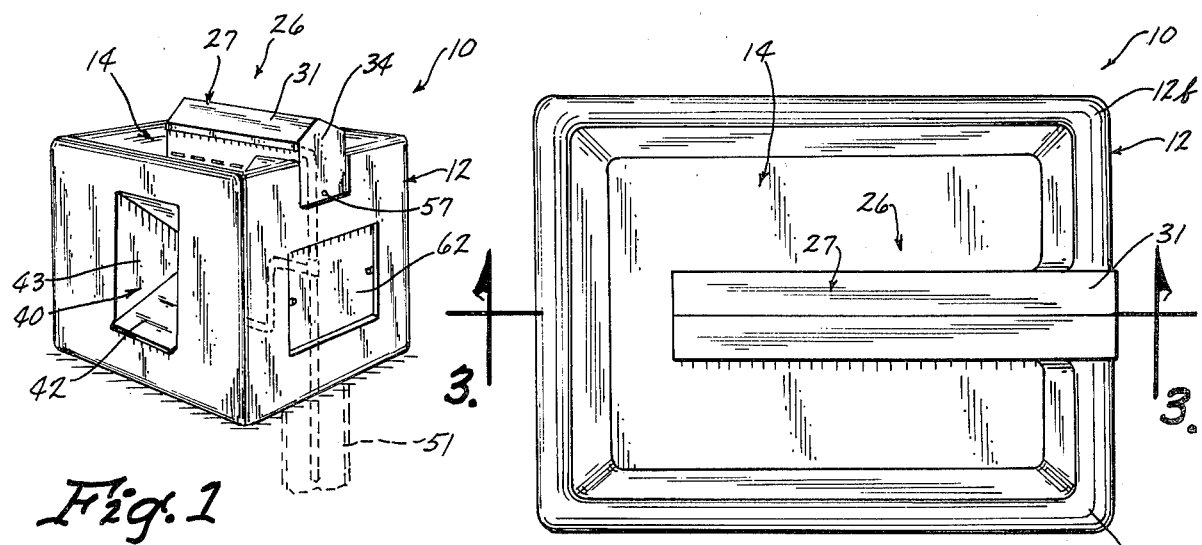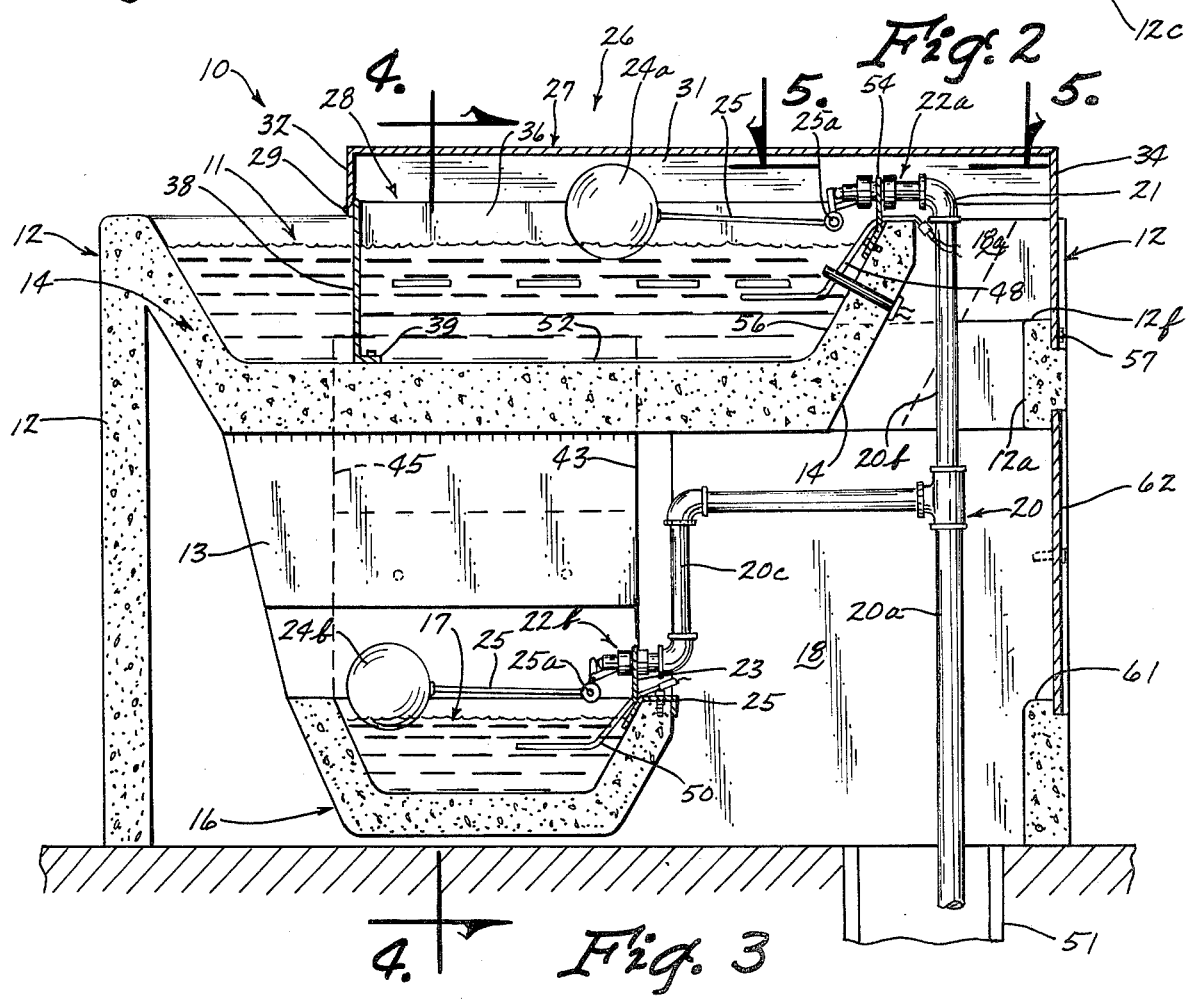

U.S. Patent  Dec. 19, 1978  Sheet 2 of 2  4,130,090
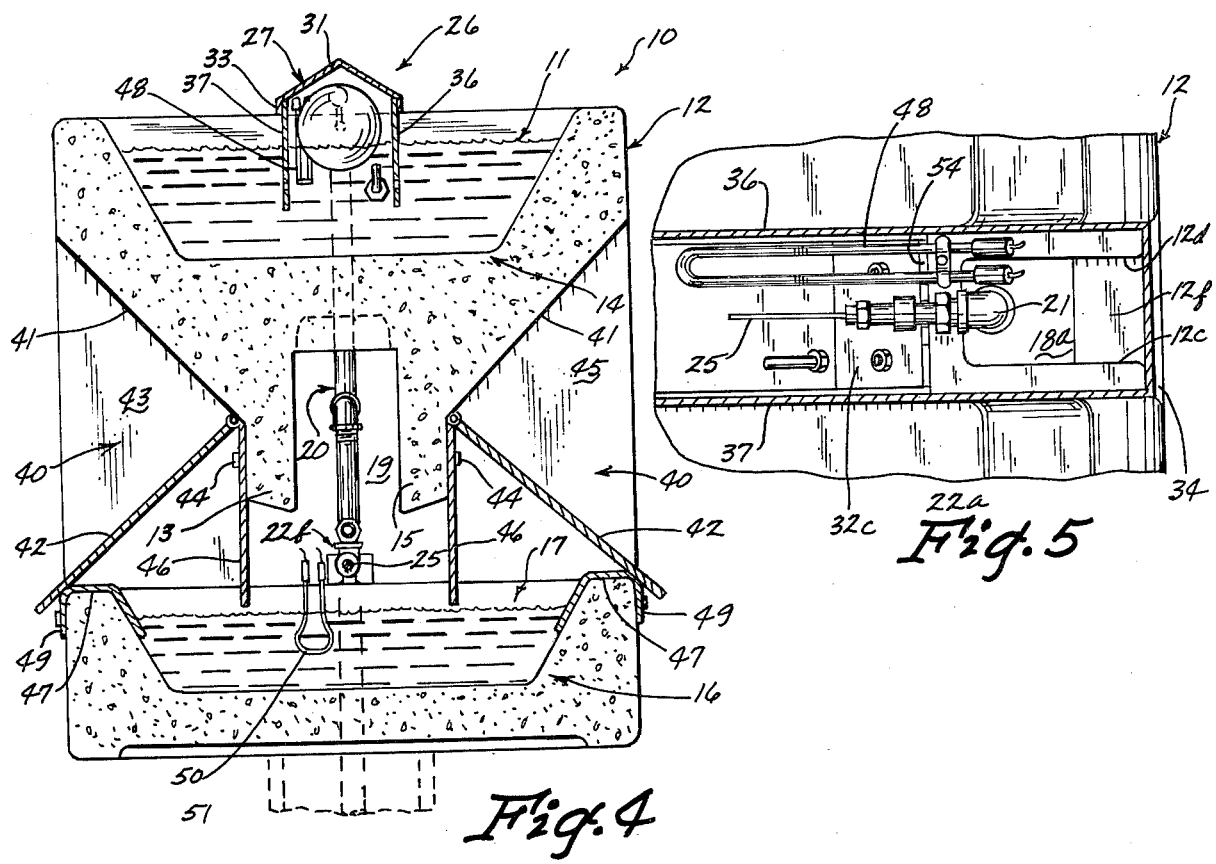
Fig. 4
Fig. 5
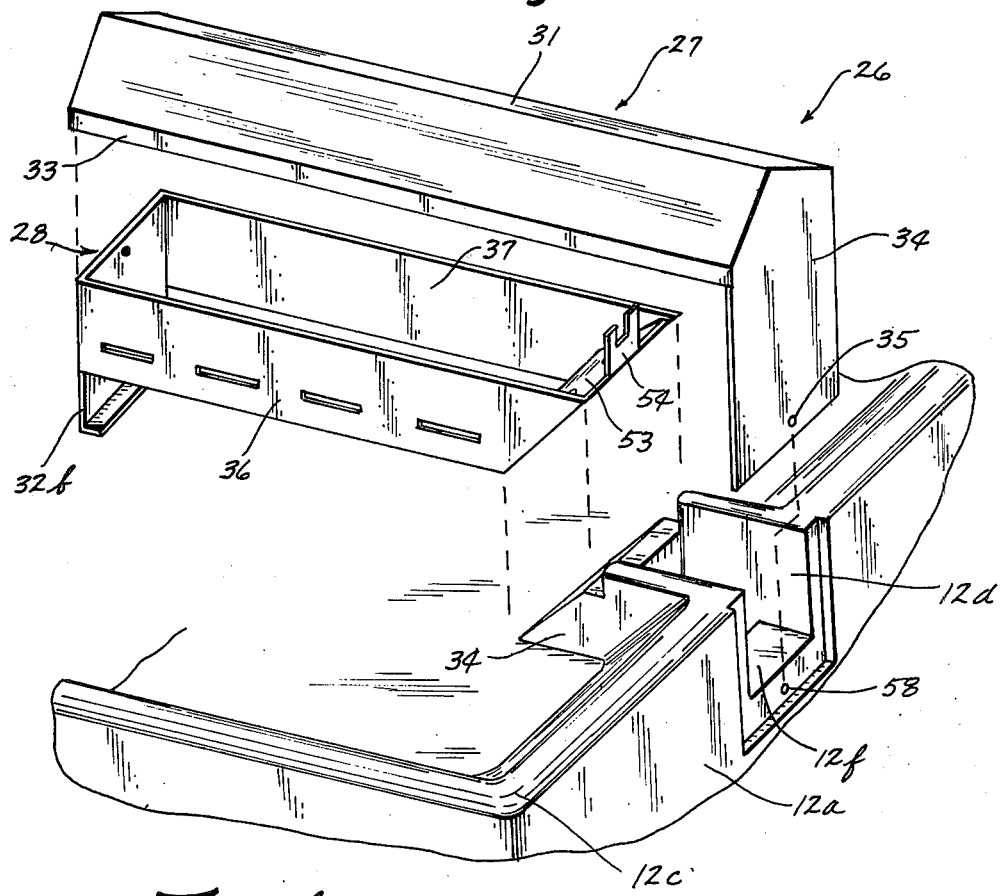
Fig. 6

AUTOMATIC LIVESTOCK WATERER

BACKGROUND OF THE INVENTION

The present invention relates generally to livestock waterers and more particularly to a concrete automatic livestock waterer.

Typical of livestock waterers in use in the farm industry are the steel tank waterers. These tanks typically are formed of metal sheets with a coating of rust resistive paint or plating. The waterers generally have a large tank area in which the water for the livestock is located. Usually positioned over the tank is a control apparatus which controls the water level in the tank and in some instances also supplies a source of heat to the water to prevent it from freezing during sub-freezing temperatures. A disadvantage associated with this type of livestock waterer is the amount of watertrough area into which the water level control apparatus extends. Livestock drinking is limited generally to the two open ends of the tank and severely restricted around the edges of the water level control apparatus. This greatly reduces the overall efficiency of the livestock waterer in terms of the total number of livestock it can support. This is very undesirable, expecially in view of the trend towards larger livestock feeding operations and the fact that this generally results in necessitating the purchase of additional livestock watering equipment.

Another serious disadvantage associated with metal livestock watering apparatus is the tendency after several years of use to adversely effect the taste and smell of the water. Oftentimes, the water, if allowed to stand during periods of warm temperatures, will turn blackish in color with scum forming on the surface. This type of water condition is certainly not appetizing to the watering livestock much less healthful for them.

Because of the metallic materials, constant rusting and oxidation is an everpresent problem, both in the actual watering tank and the supporting frame structure. Because of the continuous pushing and bumping against the waterers by the livestock using same, the rust resistance coatings very often wear off or are cracked, thus resulting in rust forming on the metallic material. Besides the obvious problem concerning the water having rust in it, the supporting structure providing the very necessary insulation to the water tank during sub-freezing temperatures would be effected over a period of time. If this situation became severe enough, the unit could freeze up because the insulative properties of the metallic frame structure would have deteriorated sufficiently to prevent the heating elements within the water from keeping the water and the valving from freezing. Further, the structure providing the vertical support for the watering tank could be weakened to a stage of being unable to support the watering tank thus necessitating the complete replacement of the livestock watering apparatus.

Another problem associated with the typical livestock watering apparatus is their requirement of being mounted additionally on a rigid, non-movable supporting structure. Generally, these field watering tanks must be bolted or in some other manner secured directly to a structure which is implanted into the ground. This increases the cost of the livestock waterer since very often this necessitates the pouring of a concrete slab which is both time consuming and expensive.

A further problem associated with some types of livestock waterers is the placing of a riser pipe in the watering tank itself. Because of the chemical reaction of the water and the electrolysis properties of the water, the riser pipe would be subject to weather and deterioration. Further, it would be possible in some instances for the water in the tank to be siphoned back into the riser pipe and circulated through a farm or municipal water supply thus presenting a health hazard to other livestock and people. This problem was exemplified recently when Wisconsin required by statute that the riser pipe be dry, thereby preventing the possibility of siphoning back into the water source. Furthermore, the removal of the internal plumbing within the waterer may require the complete disassembly of the unit which may not be feasible in the field.

Still another problem is the exposure of the float and heating element in the upper trough to the atmosphere. This results in inefficient heating and ice formation, thus rendering the float and associated valving inoperable.

SUMMARY OF THE INVENTION

The above and other disadvantages of prior art livestock watering apparatuses are overcome in accordance with the present invention by providing a concrete housing having formed in its upper portion a trough adapted to hold water. The housing further has a well formed at one end between the trough and the outside wall of the housing, and which well is physically spaced from the water trough. In alternate embodiments, the housing may include in its bottom portion a second trough. The plumbing assembly is located completely in the well and is fluidly connected at its lower end to the water source. The water level in each trough is controlled by a float in each trough which is coupled in turn to a valve assembly portion of the plumbing assembly. A float cover assembly projects outwardly from a wall adjacent to the well and is positioned above and surrounding the float in the top trough to protect the float from being damaged by the watering livestock. The float cover assembly also includes a bracket for easy mounting of the valve assembly for the top trough. A service opening is formed in the housing adjacent to the well which allows access to the plumbing assembly and its associated hardware for expeditious repair and/or removal.

It is thus an object of the present invention to provide a livestock watering apparatus which provides for maximum drinking areas.

Another object of the invention is to provide a livestock watering apparatus in which the water remains fresh and pleasant over long periods of time.

Yet another object of the invention is to provide a livestock waterer which provides quick and easy access to all components for service and repair.

Another object of the invention is to provide a rugged, heavyduty stock waterer which is simple of design, efficient in operation, and economical.

It is another object of the invention to provide a livestock waterer wherein the plumbing for supplying the water to the trough is completely separated from the trough.

Yet another object of this invention is to provide a livestock waterer wherein the riser pipe from the source of water for the trough is physically separated from the trough, enabling the use of non-siphoning valves and obviating the possibility of any siphoning action out of the trough.

Still another object of this invention is to provide a livestock waterer wherein a portion of an upper wall at one end of the waterer is cut away to form a well separated from either upper or lower trough and into which plumbing for the waterer can readily be installed and serviced.

It is a further object of this invention to provide a cover for the upper trough heater wherein the heat is retained within the cover for aiding in preventing the trough water from freezing.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the livestock waterer of this invention;

FIG. 2 is an enlarged top view thereof;

FIG. 3 is a further enlarged cross-sectional view taken along line 3—3 in FIG. 2;

FIG. 4 is a cross-sectional view taken along line 4—4 in FIG. 3;

FIG. 5 is a fragmentary plan view taken along the line 5—5 in FIG. 3; and

FIG. 6 is an exploded perspective view of a fragmentary portion of the waterer housing and of the float and heating element hood.

DESCRIPTION OF THE PREFERRED EMBODIMENT

As shown in FIGS. 1, 3 and 4, the livestock watering apparatus of this invention is generally depicted at 10, and includes a housing 12 having disposed within its upper portion a top trough 14. Located within the bottom portion of the housing 12 is the bottom trough 16. Positioned between the housing 12 at one end thereof and the troughs 14 and 16 is a well 18. Positioned in the well 18 is a plumbing assembly 20 which is coupled to the water source through a tile 21 and to valve assemblies 22a and 22b. The valve assemblies 22a and 22b are individually coupled to float elements 24a and 24b which are located in troughs 14 and 16, respectively. A float cover unit 26 is disposed over the upper valve assembly 22a and float element 24a. A pair of heating elements 48 and 50 conventially connected by means not shown, are disposed in the water of the upper and lower troughs 14 and 16, respectively.

Specifically, the housing 12 is formed from precast, reinforced concrete. By the use of concrete, the rusting of the walls, base and troughs is completely eliminated. Furthermore, there is no need to bolt the housing down to the ground since it normally would have enough weight to withstand the constant pushing and bumping of watering livestock. Formed within the upper portion of the housing 12 is the top trough 14, a U-shaped structure in both longitudinal and transverse section (FIGS. 3 and 4). The top trough 14 is adapted to hold water 11 and in some instances, may have an epoxy coating which would further resist the growth of fungus and bacteria and will further ensure the elimination of odor and black scum from forming on the water. The top trough 14 is particularly adapted for the watering of cattle, horses and other larger sized animals.

In some instances, it may be desirable to have a combination waterer, which is capable of watering both large and small sized livestock. A combination waterer capable of watering both large and small sized livestock would be more economical since only one connection to the water source would be necessary. It is for the above reasons that the preferred embodiment of the invention depicts a livestock waterer containing both an upper trough 14 and a bottom trough 16. The bottom trough 16 is disposed within the lower portion of the housing 12 and is similar in shape and construction to the top trough 14 and may also contain a wear resistant epoxy coating as discussed above in relation to the top trough 14. Although not shown, the interior wall of the housing may have a polystyrene insulation permanently bonded thereto to provide maximum heating economy in the winter and cool water in the summer.

Positioned between the top trough 14 and the housing 12 is a well 18. The well 18 extends downwardly between an end 14a of the top trough 14 and an end 12a (FIG. 3) of the housing 12 and underneath the top trough 14 to encompass the full area underneath the top trough 14 that is not occupied by the bottom trough 16. The well 18 is adapted for placement of the plumbing assembly 20.

It is to be noted that the upper portion 18a (FIG. 3) of the well 18 is also formed by a portion of the housing 12 intermediate the corners 12b and 12c (FIG. 2) being removed at the end 12a, the cut-out formed by side walls 12d and 12e (FIG. 5) and bottom 12f. By this arrangement, the upper portion 18a of the well 18 is exposed from the top and from the end of the waterer housing. Referring to FIG. 4, it may be seen that the interior of the second trough above the water 17 thereof is open at 19 to the well 18 therebehind due to the spaced formation of the interior walls 13 and 15 of the housing 12.

At each side of the housing 12, an opening 40 (FIGS. 1 and 4) is formed, each opening 40 having an inwardly, downwardly formed top wall 41, a pair of straight, parallel vertical side walls 43 and 45, and a short bottom ledge 47 that leads to the bottom trough 16.

The plumbing assembly 20 is coupled at its lower portion to the water source which in the preferred embodiment is the riser pipe 20a which generally extends through the tile 51 underground under the frost level until directly underneath the livestock waterer. Then it passes above the frost zone and into the well 18 for interconnection with the plumbing assembly 20. The upper portion 20b of the plumbing assembly 20 extends vertically in the well along the top trough 14 and housing 12 to a height approximately that of the top edge of the top trough 14. At this point, an elbow 21 fluidly connects the valve assembly 22a to the end of the upper portion of plumbing assembly 20.

In embodiments of the livestock waterer where a bottom trough 16 is also present, a second pipe 20c is a part of the plumbing assembly 20 and fluidly couples the bottom trough 16 with plumbing assembly 20. The pipe 20c may be secured to the bottom trough 16 by a bracket 23 which is secured to a ledge of the bottom trough 16. Positioned on the inner end of the pipe 20c is a valve assembly 22b which rests upon a U-shaped bracket 23 secured to a ledge 25 of the bottom trough 16. Float elements 24a and 24b are mechanically coupled to the valve assemblies 22a and 22b, respectively, each by a rod 25 via a pivot 25a. The float elements 24a and 24b float on the surface of the water and actuate the valve assemblies 22a and 22b by their conventional manner of operation. This arrangement prevents water in the troughs from being siphoned back into the riser pipe and the water source.

Positioned above and enclosing the float element 24a is float cover unit 26. The cover unit 26 includes an elongated top 27 which in the preferred embodiment is pitched so as to shed snow and ice. It will be noted the length of the top 27 is such that it leaves a U-shaped portion of the upper trough 14 free for use. The cover unit 26 comprises two parts as shown in FIG. 6, a cover 27 and an enclosure 28, both parts normally secured together as by conventional fastening devices 29 at one end.

The cover 27 includes a pitched roof portion 31, a short end 32, a flange 33 on each side of the roof portion 31, and a long end 34 having an aperture 35 formed therein. The enclosure 28 includes parallel, upright side walls 36 and 37 of a lateral spacing such that they fit snugly within the flanges 33 (FIG. 4), an upright end 38 adapted to fit within the end 32 (FIG. 3) and having a leg 39 adapted to rest on and be secured to the floor 52 of the upper trough 11, and a sloped end wall 53 having a U-shaped bracket 54 extended upwardly therefrom. The wall 53 rests upon a sloping portion 56 of the interior of the trough 11 as best seen in FIG. 3; whereas the bracket 54 snugly receives the non-siphoning valve 22a, the arrangement adapted for quick removal therefrom.

When assembled, the long end 34 of the cover unit 27 completely covers the exposed upper portion 18a of the well 18, being fastened by a device 57 inserted through the aperture 35 provided therefore into a receiving hole 58 (FIG. 6). The cover unit 27 is thus supported in a sturdy manner above and around the upper float 24a and the upper valve assembly 22a (FIGS. 3 and 4) while leaving a substantial portion of the trough 11 unrestricted for use.

To gain access to the well 18, a rectangular service opening 61 is formed within the housing end wall 12a. The service opening 61 allows free and extensive access to the interior of the well 18 for inspection and service of the interior components. Also, because of the design of the service opening (FIG. 3) the entire plumbing assembly 20 once disconnected from the riser pipe 20a and the floats 24a and 24b may be withdrawn as a unit. This feature would be very convenient especially during cold weather operation since all internal operating components could be easily removed from the livestock waterer by this procedure whereby the servicing may be performed at a more suitable warmer location. It will be noted that the entire plumbing assembly 20 falls within a single plane (FIG. 4). During normal operation of the livestock waterer, the service opening 61 is closed by a plate 62.

As mentioned hereinbefore, side openings 40 allow access into the livestock waterer to the bottom trough 16. Lids 42 (FIG. 4) are hingedly attached to shielding plates 46, in turn secured by fasteners 44 to the interior of housing 12, and extend in an angled configuration downward and outward, passing over a reinforced edge 47 of the housing 12 and the bottom trough 16. The lids at the lower portion contact the reinforcement 49 which absorbs the shock of the lids 42 being dropped against the bottom trough 16 and prevents the breaking and damaging of the concrete housing 12. The lids 42 help prevent the water contained in the bottom trough 16 from becoming contaminated and unsuitable for drinking. They are of conventional design and are accepted in the industry for this purpose. Each shielding plate 46 extends downward from the interior of the housing 12 to a short distance above the water level contained in the bottom trough 16. The plates prevent the watering livestock from damaging the components positioned in the bottom trough 16 by preventing their access to the center of the bottom trough 16.

The livestock waterer may be used during sub-freezing temperatures by employing a suitable heating device to prevent the freezing of the water and the valve assemblies. This particular embodiment has an electrical resistant heating element 48 disposed within the top trough and an identical element 50 disposed within the bottom trough. These heating elements are conventional in design and function and are controlled by a single thermostat 59 mounted in an aperture formed therefore in the wall 14a of the top trough 11, whereby the thermostat is normally below the waterline. Further, if a source of electricity would not be available, a gas heater which is capable of supplying the necessary heat to prevent the troughs 14 and 16 and the accompanying valve assemblies from freezing may be positioned inside the well 18.

I claim:
1. Livestock watering apparatus comprising:
   a rectangular housing having formed in the upper portion thereof a first rectangular trough adapted to hold water, said housing having formed additionally therein a well, spaced from said first trough;
   means for controlling the level of the water within said first trough, said means having a float located in said first trough, said means further including a plumbing assembly positioned in said well and fluidly connected to a source of water and to said float via a valve assembly, said valve assembly operated in response to the level of said float for maintaining a predetermined water level in said first trough;
   further wherein said well is formed within one end of said housing, comprising a hollow interior area of said housing below the closed bottom of said trough, and comprising further a hollow area open to the top and to an adjacent end of the housing and forming thereby top and end openings, whereby the well is exposed from the top and from an adjacent end of the waterer; and
   further wherein a portion of the housing at one end thereof intermediate the end corners and having a depth toward the bottom of the housing is removed to form the said opening of said well to the top and end of said housing; and
   further wherein a cover unit is positioned above and about said float and valve assembly, and said cover unit comprises a top element positioned over said float and valve assembly, a front end mounted on the floor of said first trough, a rear end secured to said housing and covering said top and end openings, and a pair of parallel side walls extended from said front end on either side of said float, toward said rear end, said front end and said side walls all spaced inwardly from the walls of said trough whereby water in said trough surrounds said front end and said side walls.

* * * * *